US009895968B2

(12) United States Patent
Kito et al.

(10) Patent No.: US 9,895,968 B2
(45) Date of Patent: Feb. 20, 2018

(54) FUEL SUPPLY SYSTEM

(71) Applicant: TOYODA GOSEI CO., LTD., Kiyosu-shi, Aichen-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 138 days.

(21) Appl. No.: 14/601,493

(22) Filed: Jan. 21, 2015

(65) Prior Publication Data
US 2015/0246610 A1 Sep. 3, 2015

(30) Foreign Application Priority Data

Feb. 28, 2014 (JP) .................................. 2014-037945
Aug. 26, 2014 (JP) .................................. 2014-171074

(51) Int. Cl.
*B65D 47/02* (2006.01)
*B60K 15/04* (2006.01)
*B60K 15/03* (2006.01)
*B60K 15/035* (2006.01)

(52) U.S. Cl.
CPC ...... *B60K 15/04* (2013.01); *B60K 2015/0346* (2013.01); *B60K 2015/03538* (2013.01); *B60K 2015/047* (2013.01); *B60K 2015/0438* (2013.01); *B60K 2015/0458* (2013.01); *Y10T 29/49826* (2015.01)

(58) Field of Classification Search
CPC ............. B60K 15/03006; B60K 15/04; B60K 2015/03019; B60K 2015/03328; B60K 2015/03368; B67D 7/34; B67D 7/344; B67D 7/42

USPC ................................................ 220/86.1, 86.2
See application file for complete search history.

(56) References Cited

U.S. PATENT DOCUMENTS 6,305,408 B1  10/2001  Goto et al.
2009/0127805 A1 *  5/2009  Benjey .................. B60K 15/04
                                              277/627

FOREIGN PATENT DOCUMENTS

| CN | 1169181 A | 12/1997 |
| EP | 0 802 365 A1 | 3/1996 |
| JP | H08-254289 A | 10/1996 |
| JP | 09-076773 A | 3/1997 |
| JP | 2000-220546 A | 8/2000 |
| JP | 2001-097054 A | 4/2001 |
| JP | 2005-271744 A | 10/2005 |
| JP | 3759981 B2 | 1/2006 |
| JP | 2011-511906 A | 4/2011 |

\* cited by examiner

*Primary Examiner* — Steven A. Reynolds
*Assistant Examiner* — Javier A Pagan
(74) *Attorney, Agent, or Firm* — Posz Law Group, PLC

(57) ABSTRACT

An object is to provide a fuel supply system having a filler neck formed easily with high accuracy. A fuel supply system is configured to supply fuel ejected from a fuel nozzle to a fuel tank. The fuel supply system comprises a filler neck including a resin filler neck body and a metal retainer. The filler neck body is formed in a tubular shape and has an opening end arranged to form an opening which the fuel nozzle is inserted through. The retainer is placed to cover at least part of the opening end of the filler neck body and is joined with the filler neck body in at least part of the filler neck body by thermal welding.

11 Claims, 12 Drawing Sheets

FUEL SUPPLY SYSTEM

CROSS-REFERENCE TO RELATED APPLICATIONS

This application claims priorities to Japanese Patent Applications No. 2014-37945 filed on Feb. 28, 2014, and No. 2014-171074 filed on Aug. 26, 2014, entire disclosures of which are incorporated herein by reference for all purposes.

TECHNICAL FIELD

The invention relates to a fuel supply system configured to supply fuel to a fuel tank of, for example, an automobile.

DESCRIPTION OF RELATED ART

A fuel supply system used for a vehicle includes a resin filler neck in a tubular shape and a metal retainer attached to an end of the filler neck to form a filler port. A proposed method of manufacturing the filler neck having the retainer attached thereto employs the technique of injection molding or blow molding of a resin into a mold which the retainer is inserted therein (for example, JP H09-76773A).

SUMMARY

In the method of manufacturing the filler neck by injection molding or blow molding of a resin into the mold which the retainer is inserted therein, however, in order to form the shape of the filler neck with high accuracy, effort is needed to bring the inserted retainer in close contact with the mold. Other needs with respect to the fuel supply system include downsizing, improvement of reliability, resource saving, easy manufacture and improvement of usability.

The invention may be implemented by any of the following aspects, in order to solve at least part of the above problems.

(1) According to one aspect of the invention, there is provided a fuel supply system is configured to supply fuel ejected from a fuel nozzle to a fuel tank. The fuel supply system comprises a filler neck including a resin filler neck body and a metal retainer. The filler neck body is formed in a tubular shape and has an opening end arranged to form an opening which the fuel nozzle is inserted through. The retainer is placed to cover at least part of the opening end of the filler neck body and is joined with the filler neck body in at least part of the filler neck body by thermal welding.

In the fuel supply system of this aspect, the filler neck body is joined with the retainer by thermal welding. This enables the filler neck body to be joined with the retainer easily with high accuracy, compared with the technique of manufacturing the filler neck by injection molding or blow molding of a resin into a mold having a retainer inserted therein.

(2) In the fuel supply system of the above aspect, the retainer may be joined with the filler neck body in at least part of an outer circumference of the filler neck body by thermal welding. The configuration that the retainer is joined with the filler neck body in the outer circumference of the filler neck body by thermal welding makes the molten resin less likely to flow to the inner circumferential side of the filler neck body, compared with the configuration that the retainer is joined with the filler neck body in the opening end or in the inner circumference of the filler neck body.

(3) In the fuel supply system of the above aspect, the filler neck may have a suppression element formed between the outer circumference of the filler neck body and the retainer and between the opening end of the filler neck body and a weld at which the filler neck body is welded to the retainer, and arranged to suppress resin melted during thermal welding from flowing into the opening end side. This suppresses the resin melted during thermal welding from flowing through the opening end to the inner circumferential side of the filler neck body and thereby reduces the likelihood of a trouble, such as catch of a filler cap due to deformation of the inner circumferential shape of the filler neck body.

(4) In the fuel supply system of the above aspect, the suppression element may be formed as a projection on the other circumference of the filler neck body. This facilitates formation of the suppression element.

(5) In the fuel supply system of the above aspect, the suppression element may be formed in an annular shape. This suppresses the molten resin from flowing to the inner circumferential side of the filler neck body over the entire circumference of the filler neck body.

(6) In the fuel supply system of the above aspect, the filler neck body may have an enlarged diameter part having diameter gradually increasing with an increase in distance from the opening end, and the weld may be part of an outer circumference of the enlarged diameter part. In this configuration, the weld is formed in the enlarged diameter part along a direction not parallel to the direction of insertion of the fuel nozzle to the fuel tank. This facilitates positioning of the retainer relative to the filler neck body and thus enables the filler neck body and the retainer to be joined with each other more easily.

(7) In the fuel supply system of the above aspect, the enlarged diameter part may include a reverse tapered section having the diameter gradually increasing with an increase in distance from the opening end. When the retainer as an insert is placed on the filler neck body, this configuration enables the filler neck body to be joined with the retainer in the reverse tapered section with higher accuracy.

(8) In the fuel supply system of the above aspect, the filler neck may have a regulation element formed in an approximately spiral shape between the outer circumference of the filler neck body and the retainer at a position near to the weld and on an opposite side to the opening end across the weld. The flow of the molten resin toward the opening end is suppressed by the suppression element, so that the molten resin flows out to the opposite side to the opening end. The regulation element formed in the approximately spiral shape adjusts the flow of the resin and suppresses the uneven distribution of the resin. As a result, this suppresses a variation in strength of joining the filler neck body with the retainer, thus reducing the likelihood of damage of the filler neck and suppressing a decrease in strength of the filler neck.

(9) In the fuel supply system of the above aspect, the regulation element may be formed as a projection on the outer circumference of the filler neck body. This facilitates formation of the regulation element.

(10) In the fuel supply system of the above aspect, the retainer may have a hole formed in at least part of a portion opposed to the outer circumference of the filler neck body. The resin melted during thermal welding flows into the hole formed in the retainer. The resin flowing in the hole prevents unintentional detachment of the retainer from the filler neck body in the direction of pulling out the fuel nozzle inserted in the fuel tank.

(11) According to another aspect of the invention, there is provided a manufacturing method of a fuel supply system configured to supply fuel ejected from a fuel nozzle to a fuel tank. The manufacturing method comprises: providing a resin filler neck body formed in a tubular shape to have an opening end arranged to form an opening which the fuel nozzle is inserted through; providing a metal retainer configured to cover at least part of the opening end of the filler neck body; laying the retainer over the opening of the filler neck body; and heating at least part of the retainer, so as to join the retainer with the filler neck body by thermal welding.

The manufacturing method of the fuel supply system according to this aspect enables the filler neck body to be joined with the retainer easily with high accuracy, compared with the manufacturing method of the filler neck by injection molding or blow molding of a resin into a mold having a retainer inserted therein.

The invention may be implemented by any of various other aspects: for example, a filler neck, an apparatus including the fuel supply system, a moving body including the fuel supply system, a vehicle including the fuel supply system and a manufacturing method of the filler neck.

The above aspects of the invention enable the filler neck body to be joined with the retainer easily with high accuracy, compared with the technique of manufacturing the filler neck by injection molding or blow molding of a resin into a mold having a retainer inserted therein.

DESCRIPTION OF EMBODIMENTS

A. First Embodiment (A1) Configuration of Fuel Supply System

Figure 1:
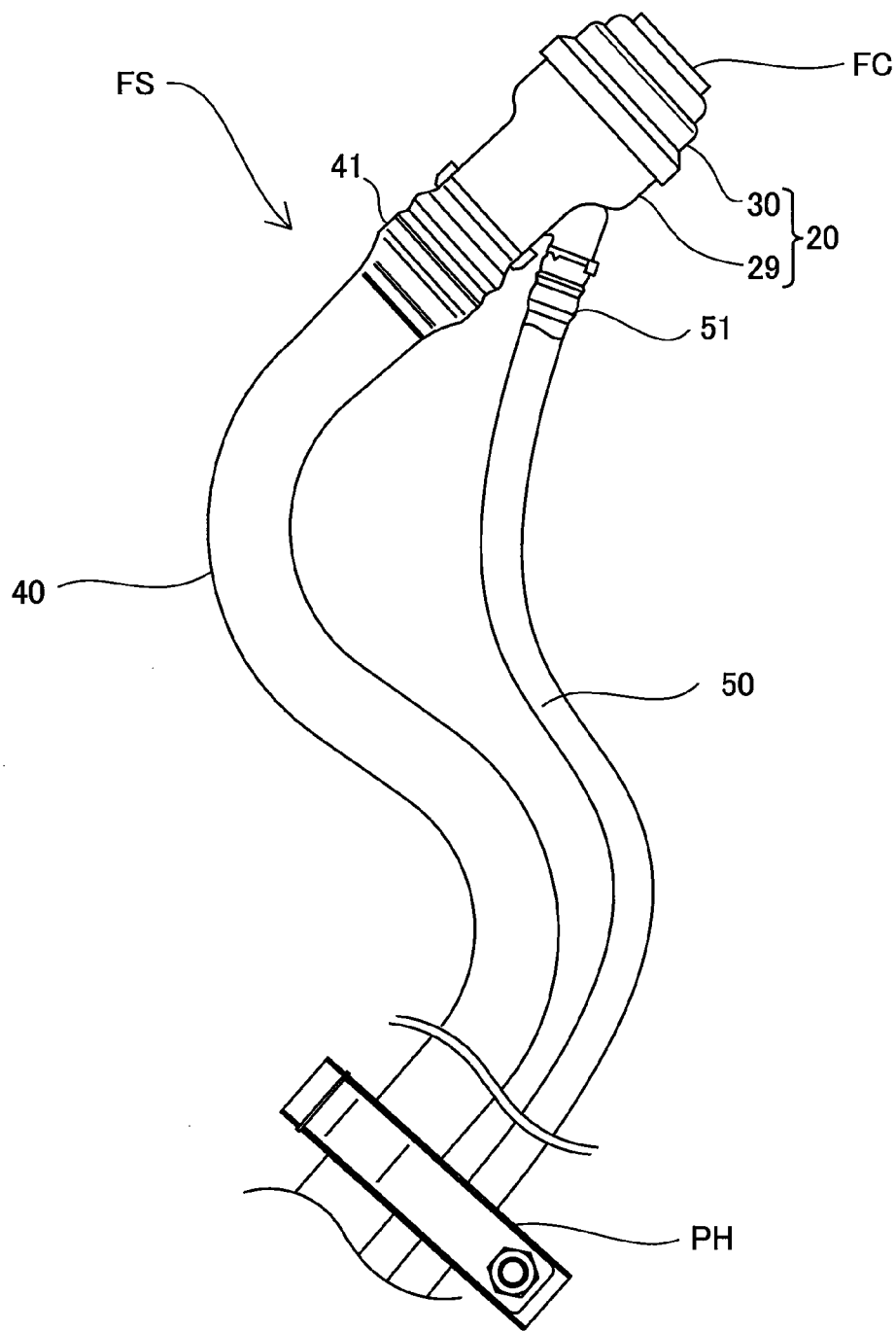
FIG. 1 is a diagram illustrating the general configuration of a fuel supply system according to a first embodiment of the invention.

FIG. 1 is a diagram illustrating the general configuration of a fuel supply system FS according to a first embodiment of the invention. The fuel supply system FS is used for fuel supply to a fuel tank of an automobile and includes a fuel cap FC, a filler neck 20, fuel pipes 40 and 50 connected with the filler neck 20, a pipe holding unit PH for attachment of the fuel pipes 40 and 50 to a vehicle body-side member (not shown) and tank connecting members (not shown) used to connect the respective ends of the fuel pipes 40 and 50 to the fuel tank.

For fueling, the fuel cap FC is removed from the filler neck 20, and fuel is injected from a fuel gun (not shown) into the filler neck 20. The fuel is then supplied through a fuel supply passage formed by the filler neck 20 and the fuel pipe 40 to the fuel tank.

The fuel pipe 40 is a resin pipe arranged to connect the filler neck 20 with the fuel tank and has one end connected with the filler neck 20 and the other end connected with the fuel tank. The fuel pipe 50 is a breather pipe arranged to circulate the fuel vapor in the fuel tank into the fuel pipe 40 during fueling. Similarly to the fuel pipe 40, the fuel pipe 50 has one end connected with the filler neck 20 and the other end connected with the fuel tank. The fuel pipes 40 and 50 are made of polyethylene.

The fuel cap FC has a threaded part and is screwed to a threaded part formed on the inner circumference of the filler neck 20 to be attached to the filler neck 20. The fuel cap FC is, however, not limited to this configuration but may have any configuration suitable to open and close an opening of the filler neck 20. For example, the fuel cap FC may have a configuration using a valve element such as a flap valve to open and close the opening (generally called capless configuration).

(A2) Structure of Filler Neck

Figure 2:
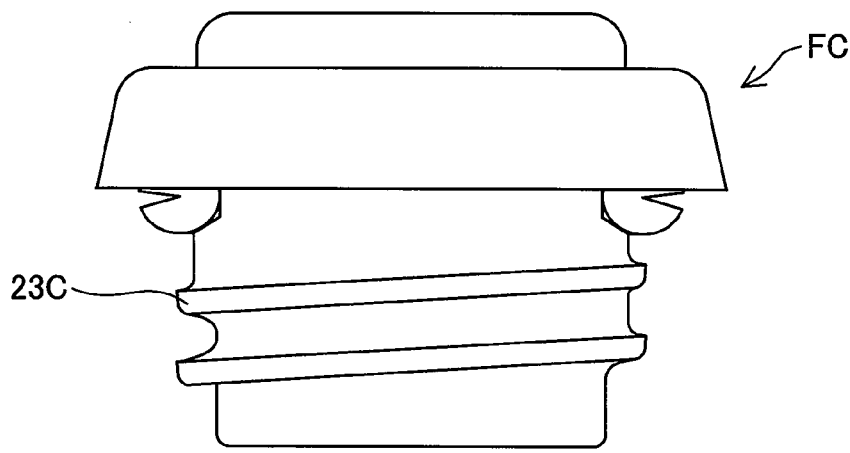
FIG. 2 is a diagram schematically illustrating the cross sectional structure of part of a filler neck in the fuel supply system of the first embodiment.
Figure 2:
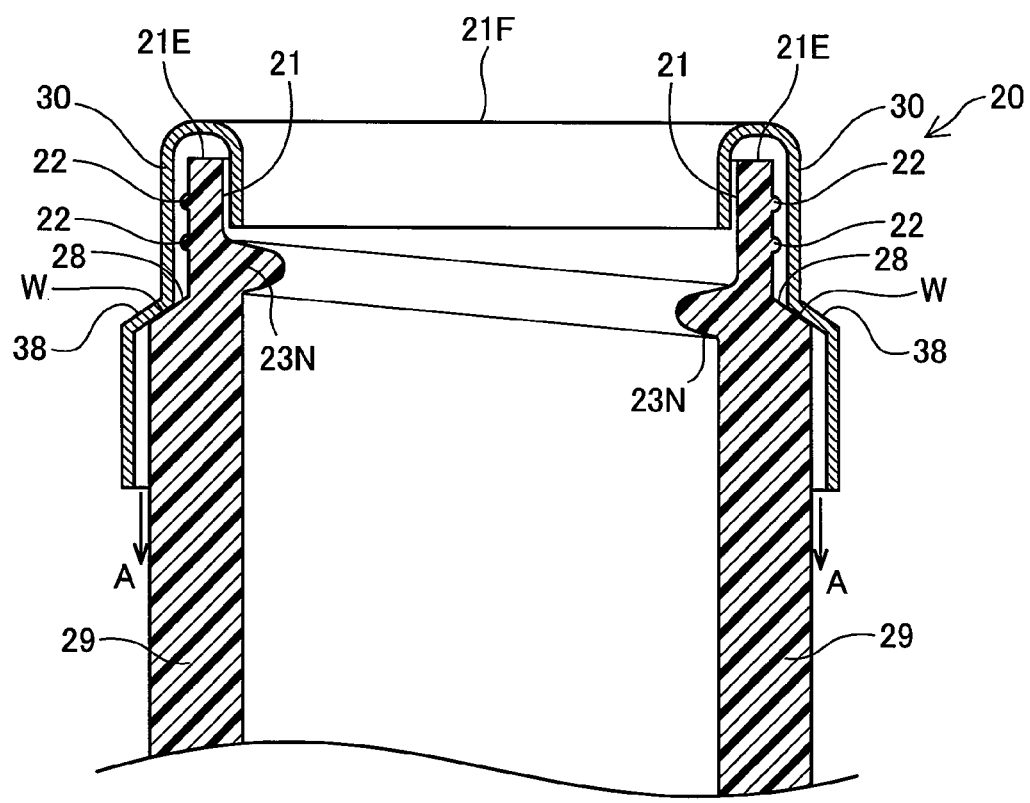
Figure 3:
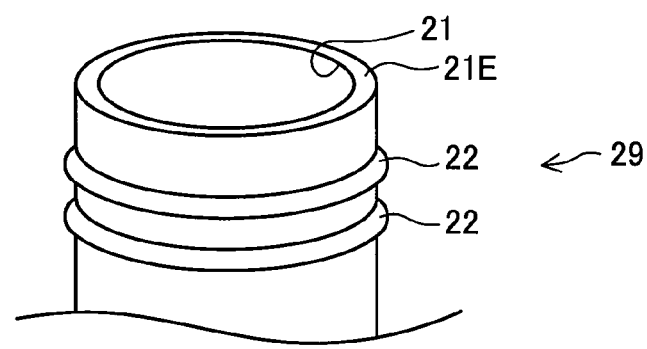
FIG. 3 is a perspective view illustrating part of a filler neck body of the first embodiment.

FIG. 2 is a diagram schematically illustrating the cross sectional structure of part of the filler neck 20 in the fuel supply system FS of the first embodiment. FIG. 2 illustrates the periphery of an opening 21F of the filler neck 20 which a fuel nozzle (not shown) is inserted through. FIG. 3 is a perspective view illustrating part of a filler neck body 29 of the first embodiment. FIG. 3 illustrates the periphery of an opening 21 of the filler neck body 29.

The filler neck 20 includes a resin filler neck body 29 and a metal retainer 30. The filler neck 20 is formed in an approximately tubular shape. An opening 21F which the fuel nozzle is inserted through is formed at one end of the filler neck 20. A pipe connecting member (not shown) connected with the fuel pipe 40 and a pipe connecting member (not shown) connected with the fuel pipe 50 are formed at the other end of the filler neck 20.

The filler neck body 29 has an opening end 21E formed to define an opening 21 which the fuel nozzle is inserted through, and a contact part 28 formed to be in contact with the retainer 30. As shown in FIG. 2, the contact part 28 forms a shallow step around the outer circumference of the filler neck body 29. As shown in FIG. 3, two annular suppression elements 22 are protruded between the opening end 21E and the contact part 28 on the outer circumference of the filler neck body 29.

A threaded part 23N is formed around the inner circumference of the filler neck body 29 to be mated with a threaded part 23C formed on the fuel cap FC. Screwing the threaded part 23C formed on the fuel cap FC with the threaded part 23N of the filler neck body 29 causes the fuel cap FC to be attached to the filler neck 20.

The filler neck body 29 is formed by injection molding of modified polyethylene by addition of the adhesiveness to metal. The filler neck body 29 may alternatively be formed by another molding technique such as blow molding or thermoforming.

The retainer 30 is a metal annular member and is placed to cover the entire circumference of the opening end 21E of the filler neck body 29 and form the opening 21F of the filler neck 20 (filler opening). An outer peripheral portion of the retainer 30 located on the outer circumferential side of the filler neck body 29 is formed to be longer than an inner peripheral portion of the retainer 30 located on the inner circumferential side of the filler neck body 29. The retainer 30 is bent at a position corresponding to the contact part 28 of the filler neck body 29 and forms a contact part 38 arranged to come into contact with the contact part 28 of the filler neck body 29.

Covering the opening 21 of the resin filler neck body 29 with the metal retainer 30 enhances the mechanical strength of the opening 21F of the filler neck 20 and thereby protects the opening 21F of the filler neck 20 from a potential damage by the fuel gun. The retainer 30 is formed by press forming a thin plate of a metal material such as stainless steel. Alternatively the retainer 30 may be formed by another molding or forming technique such as casting.

The filler neck body 29 has the contact part 28 protruded radially outward, while the retainer 30 has the contact part 38 formed to be bent along the contact part 28 of the filler neck body 29. When the retainer 30 is laid over the opening 21 of the filler neck body 29, the contact part 38 of the retainer 30 engages with the contact part 28 of the filler neck body 29, while some space is left between the retainer 30 and the opening end 21E of the filler neck body 29.

As shown in FIG. 2, the filler neck body 29 has the suppression elements 22 and thereby has the narrower space left between the retainer 30 and a portion of the outer circumference of the filler neck body 29 between the opening end 21E and a weld W, compared with the filler neck body 29 without the suppression elements 22.

The retainer 30 is joined with the filler neck body 29 at the contact part 38 by thermal welding. More specifically, the filler neck 20 is manufactured by the following method. The method provides the resin filler neck body 29 and the metal retainer 30, lays the retainer 30 over the opening 21 of the filler neck body 29 and heats the entire contact part 38 of the retainer 30 using a hot plate. The resin at the contact part 28 of the filler neck body 29 is melted by heating, and the molten resin joins the filler neck body 29 with the retainer 30 to form a weld W. According to this embodiment, the entire contact part 38 of the retainer 30 is heated using the hot plate. Alternatively, only a portion of the contact part 38 may be heated, or the entire retainer 30 may be heated.

(A3) Advantageous Effects of First Embodiment

In the fuel supply system FS of the first embodiment, the filler neck body 29 is joined with the retainer 30 by thermal welding. This enables the filler neck body to be joined with the retainer easily with high accuracy, compared with the technique of manufacturing the filler neck, for example, by injection molding or blow molding of a resin into a mold having a retainer inserted therein.

The resin filler neck body 29 is joined with the retainer 30 at the position which is on the outer circumference of the filler neck body 29 and is away from the opening end 21E by thermal welding. This configuration makes the molten resin less likely to flow to the inner circumferential side of the filler neck body 29, for example, compared with the configuration that the filler neck body 29 is joined with the retainer 30 at the opening end 21E or at the inner circumference of the filler neck body 29. Additionally, the annular suppression elements 22 are formed on the outer circumference of the filler neck body 29, so as to narrow the space between the retainer 30 and a portion of the outer circumference of the filler neck body 29 between the contact part 28 and the opening end 21E. This configuration suppresses the resin melted at the contact part 28 from flowing to the inner circumferential side of the filler neck body 29. More specifically, the molten resin flows out from the contact part 28 toward the pipe connecting member (direction of arrows A in FIG. 2). This accordingly reduces the likelihood of a trouble, such as catch of the fuel cap FC, due to deformation of the inner circumferential shape of the filler neck body 29 by the molten resin flowing to the inner circumferential side of the filler neck body 29.

B. Second Embodiment

Figure 4:
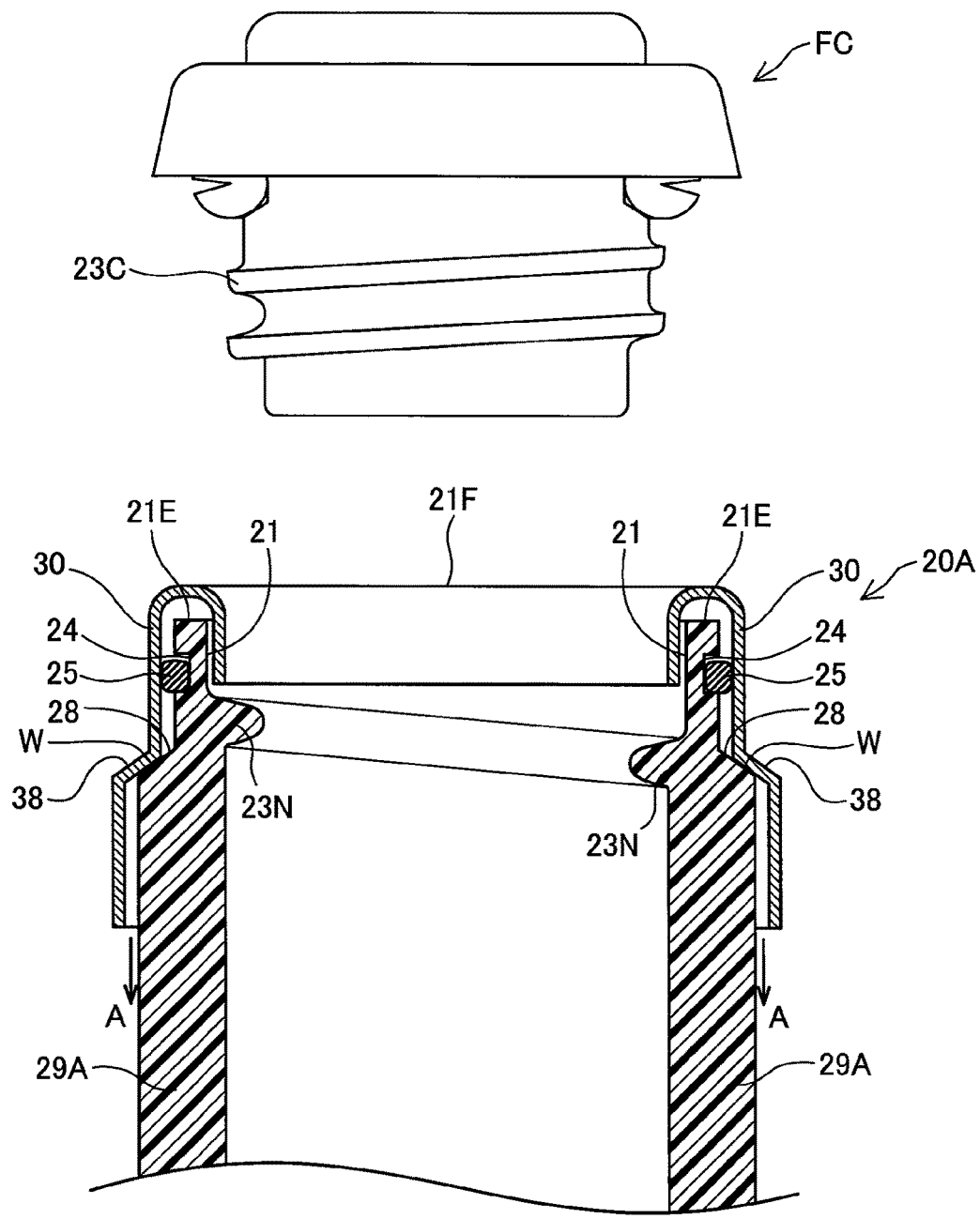
FIG. 4 is a diagram schematically illustrating the cross sectional structure of part of a filler neck in a fuel supply system according to a second embodiment.
Figure 5:
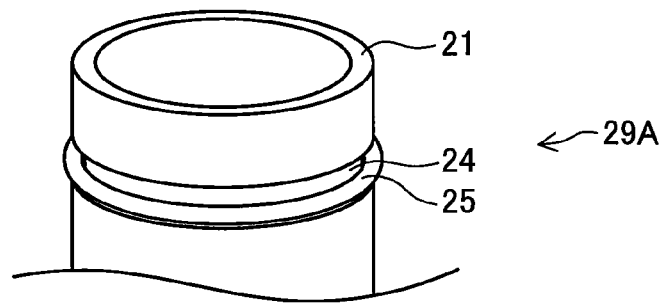
FIG. 5 is a perspective view illustrating part of a filler neck body of the second embodiment.

FIG. 4 is a diagram schematically illustrating the cross sectional structure of part of a filler neck 20A in a fuel supply system according to a second embodiment. FIG. 5 is a perspective view illustrating part of a filler neck body 29A of the second embodiment. The fuel supply system of the second embodiment differs from the fuel supply system of the first embodiment by the structure of a filler neck, but otherwise has the similar configuration, which is not specifically described herein.

The filler neck 20A of the second embodiment has an annular rubber suppression element 25, instead of the suppression elements 22 of the filler neck 20 of the first embodiment. When the contact part 38 of the retainer 30 is heated to melt the resin forming the filler neck body 29, the suppression element 25 is not melted. The material of the suppression element 25 is not limited to rubber but may be another material such as silicone.

As shown in FIGS. 4 and 5, the suppression element 25 is placed in a groove 24 formed around the outer circumference of the filler neck body 29A. When the retainer 30 is laid over the opening 21 of the filler neck body 29A, the suppression element 25 is pressurized by the retainer 30 to seal the space left between the outer circumference of the filler neck body 29A and the retainer 30. This configuration suppresses the molten resin from flowing to the inner circumferential side of the filler neck body 29A when the contact part 38 of the retainer 30 is heated to melt the resin at the contact part 28 of the filler neck body 29A.

C. Third Embodiment

Figure 6:
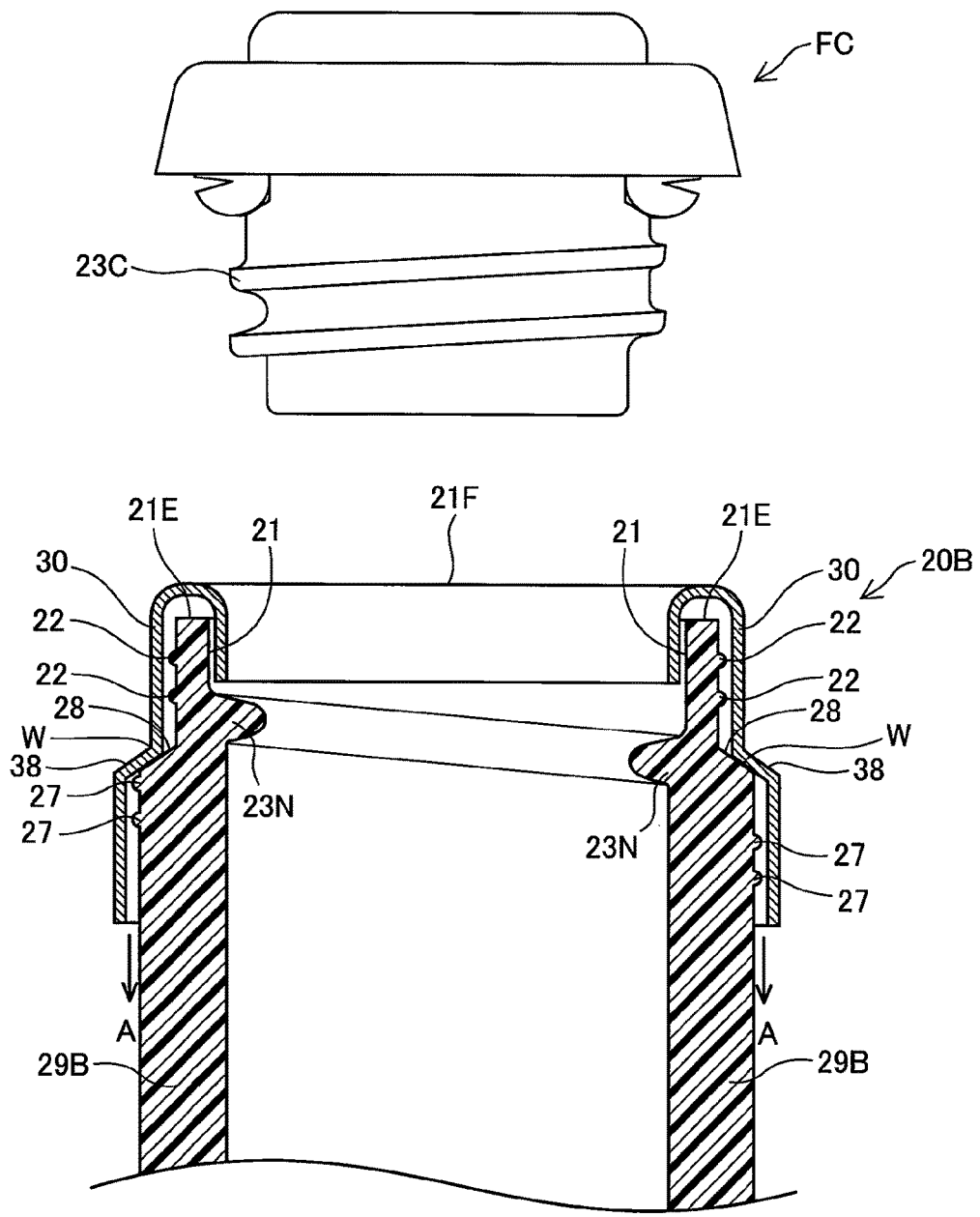
FIG. 6 is a diagram schematically illustrating the cross sectional structure of part of a filler neck in a fuel supply system according to a third embodiment.
Figure 7:
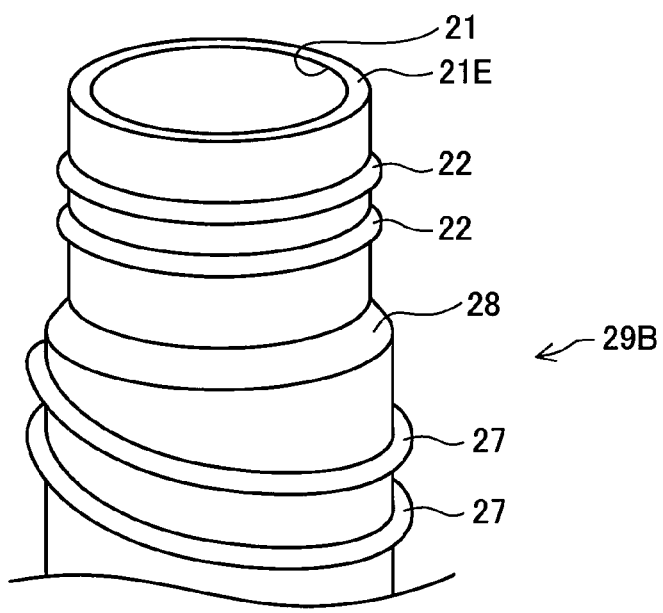
FIG. 7 is a perspective view illustrating part of a filler neck body of the third embodiment.

FIG. 6 is a diagram schematically illustrating the cross sectional structure of part of a filler neck 20B in a fuel supply system according to a third embodiment. FIG. 7 is a perspective view illustrating part of a filler neck body 29B of the third embodiment. The fuel supply system of the third embodiment differs from the fuel supply system of the first embodiment by the structure of a filler neck, but otherwise has the similar configuration, which is not specifically described herein.

The filler neck 20B of the third embodiment has a regulation element 27, in addition to the suppression elements 22 in the filler neck 20 of the first embodiment. As shown in FIGS. 6 and 7, the regulation element 27 is formed in a spiral shape and is located on the opposite side (lower side in the illustration) to the opening end 21E across the contact part 28 on the outer circumference of the filler neck body 29B.

Like the above embodiments, the filler neck body 29B is joined with the retainer 30 by thermal welding. In the filler neck 20B of this embodiment, the filler neck body 29B has the suppression elements 22 like the first embodiment. The resin melted during thermal welding of the filler neck body 29B with the retainer 30 flows in the direction opposite to the opening end 21E from the contact part 28 (direction of arrows A in FIG. 6). The filler neck body 29B and the retainer 30 are further joined with each other by this flow-out molten resin.

In the filler neck 20B of the embodiment, the molten resin flows along the regulation element 27 in the spiral shape. This regulates the distribution of the molten resin flowing out to the opposite side to the opening end 21E across the weld W on the outer circumference of the filler neck body 29B and thereby spreads over the molten resin substantially evenly in the circumferential direction between the outer circumference of the filler neck body 29B and the retainer 30. This configuration suppresses uneven distribution of the molten resin and thereby suppresses a variation in welding strength between the filler neck body 29B and the retainer 30. As a results, this reduces the likelihood of damage of the filler neck 20B and suppresses a decrease in strength of the filler neck 20B.

D. Fourth Embodiment (D1) Structure of Filler Neck

Figure 8:
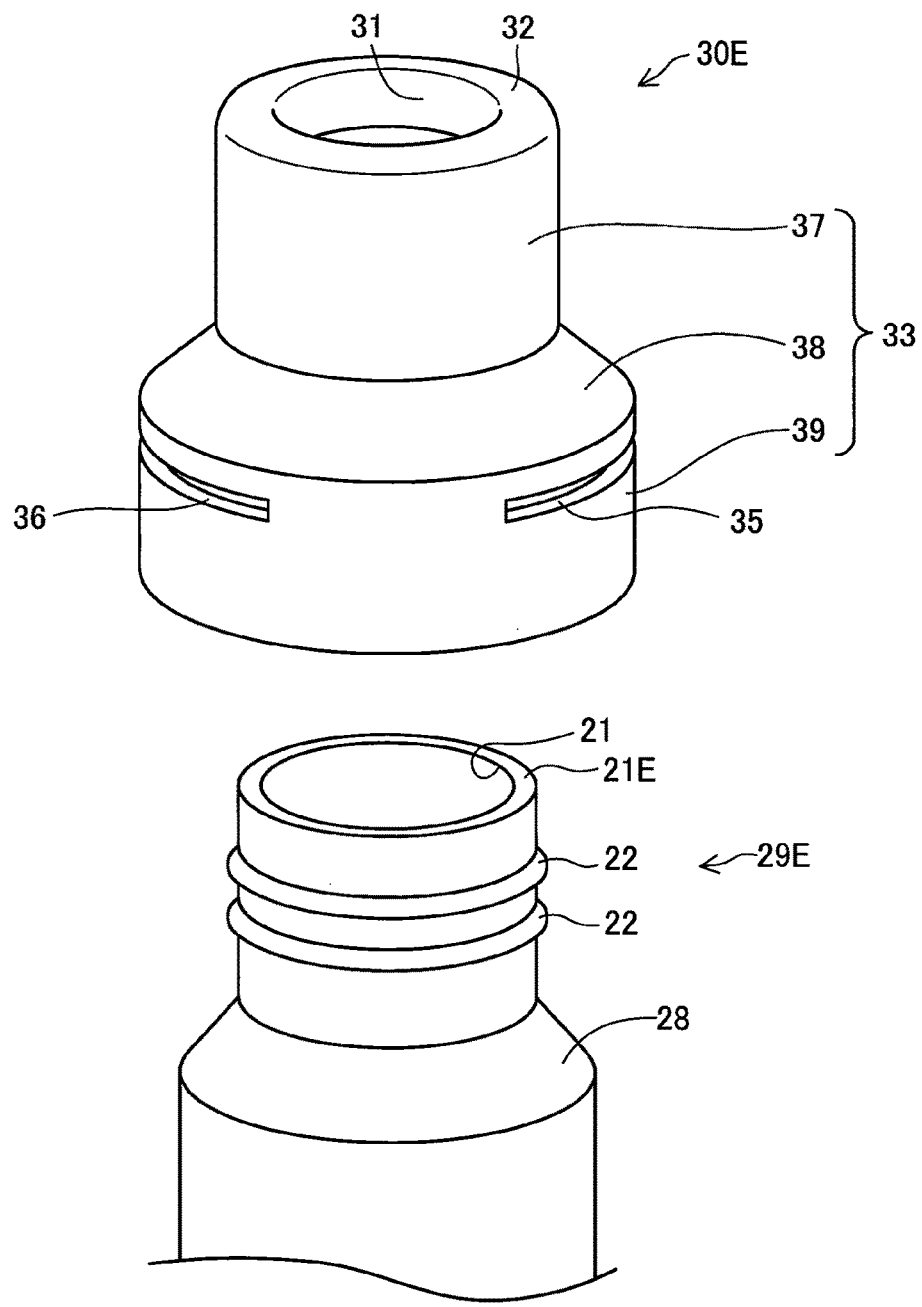
FIG. 8 is an exploded perspective view illustrating a filler neck body and a retainer of a filler neck in a fuel supply system according to a fourth embodiment.
Figure 9:
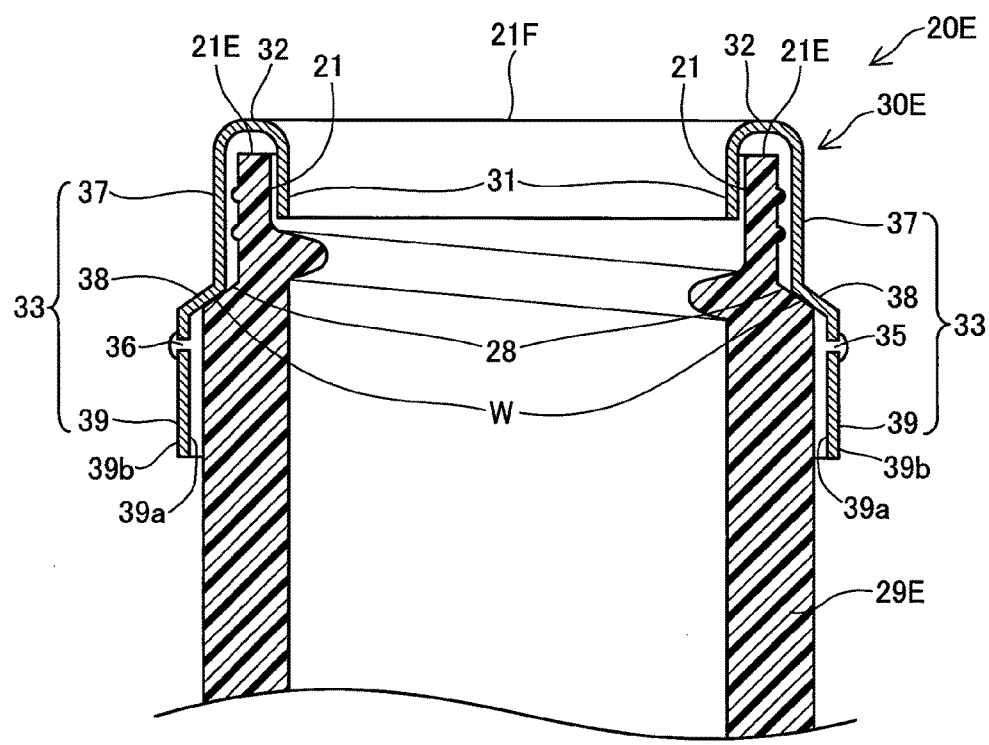
FIG. 9 is a diagram schematically illustrating the cross sectional structure of part of the filler neck of the fourth embodiment.

FIG. 8 is an exploded perspective view illustrating a filler neck body 29E and a retainer 30E of a filler neck 20E in a fuel supply system FS according to a fourth embodiment. FIG. 9 is a diagram schematically illustrating the cross sectional structure of part of the filler neck 20E of the fourth embodiment. The filler neck 20E of the fourth embodiment differs from the filler neck 20 of the first embodiment by formation of a first groove 35 and a second groove 36 in the retainer 30E and the resin material used to form the filler neck body 29E, but otherwise has the similar structure, which is not specifically described herein.

The resin material of the filler neck body 29E further includes maleic anhydride, in addition to the resin material used to form the filler neck body 29 of the first embodiment. The filler neck body 29E has the same shape as that of the filler neck body 29 of the first embodiment.

As shown in FIG. 9, the retainer 30E has an inner peripheral portion 31 located on the inner circumferential side of the filler neck body 29E when the retainer 30E as the insert is placed on the filler neck body 29E, an opposed portion 32 opposed to the opening end 21E along the axial direction, and an outer peripheral portion 33 located on the outer circumferential side of the filler neck body 29E. The outer peripheral portion 33 includes a contact part 38, a small diameter part 37 located on the opening end 21E-side of the contact part 38 and a large diameter part 39 located on the opposite side to the opening end 21E across the contact part 38 and formed to have a larger diameter than that of the small diameter part 37.

As shown in FIGS. 8 and 9, the large diameter part 39 has a first groove 35 and a second groove 36 formed to pass through the large diameter part 39 from a large diameter part inner circumferential surface 39a opposed to the outer circumference of the filler neck body 29E when the retainer 30E as the insert is placed on the filler neck body 29E to a large diameter part outer circumferential surface 39b on the opposite side to the large diameter part inner circumferential surface 39a. The first groove 35 and the second groove 36 are through holes formed on the opposite sides about the center axis of the retainer 30E to be positioned on an identical plane in the cross section perpendicular to the center axis of the retainer 30E. The first groove 35 and the second groove 36 are formed in an arc shape of 90 degrees in the large diameter part 39. The first groove 35 and the second groove 36 correspond to the hole in the claims.

The manufacturing method of the filler neck 20E is substantially similar to the manufacturing method of the filler neck 20 of the first embodiment. In the state that the retainer 30E is laid over the opening 21 of the filler neck body 29E, when the contact part 38 of the retainer 30E is heated, the resin is melted at the contact part 28 of the filler neck body 29E to form a weld W. In the filler neck 20E, simultaneously with formation of the weld W, part of the molten resin flows into the first groove 35 and the second groove 36, while part of the molten resin flows out through the large diameter part outer circumferential surface 39b of the retainer 30E. The retainer 30E is accordingly joined with the filler neck body 29E.

(D2) Advantageous Effects of Fourth Embodiment

In the fuel supply system FS of the fourth embodiment, the retainer 30E is joined with the filler neck body 29E by the molten resin flowing into the first groove 35 and the second groove 36 formed in the large diameter part 39 of the retainer 30E. The retainer 30E is accordingly joined with the filler neck body 29E with the stronger force along a direction not parallel to the axial direction of the filler neck 20E. This prevents unintentional detachment of the retainer 30E from the filler neck body 29E.

In the fuel supply system FS of the fourth embodiment, the filler neck body 29E is made of the resin material additionally including maleic anhydride. Maleic anhydride added to the resin material has reactive functional groups formed on the surface of the filler neck body 29E to form favorable chemical bonding with the retainer 30E. In the fuel supply system FS of the fourth embodiment, the filler neck body 29E and the retainer 30E are joined with each other by the stronger force, compared with the filler neck body made of the resin material without addition of maleic anhydride.

E. Modifications

The invention is not limited to the above embodiments but may be implemented by any of various other aspects or configurations without departing from the scope of the invention. Some examples of possible modification are given below.

(E1) Modification 1

The first, the third and the fourth embodiments described above have the two annular suppression elements 22. The shape and the number of the suppression elements 22 are, however, not limited to the above embodiments. The number of the annular suppression elements 22 may be only one or may be three or more. The suppression element may be formed in an annular shape with some cuts or may be formed as a large number of dot-like projections. The suppression element may not be formed around the entire outer circumference of the filler neck body 29 but may be formed along only part of the outer circumference of the filler neck body 29. The shape and the number of the suppression elements may be determined arbitrarily to provide a blockage in the space between the retainer 30 and the portion of the outer circumference of the filler neck body 29 between the opening end 21E and the contact part 28 and narrow the flow passage of the resin melted at the contact part 28 to the inner circumferential side of the filler neck body 29.

Figure 10:
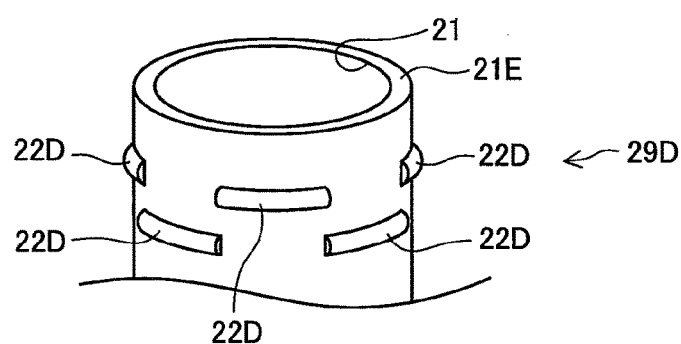
FIG. 10 is a perspective view illustrating part of a filler neck body according to one modification.

FIG. 10 is a perspective view illustrating part of a filler neck body according to one modification. As illustrated, a filler neck body 29D has annular suppression elements 22D with some cuts. This configuration also suppresses the resin melted during thermal welding from flowing to the inner circumferential side of the filler neck body 29D.

(E2) Modification 2

In the third embodiment described above, the suppression elements 22 and the regulation element 27 are provided on the outer circumference of the filler neck body 29B. The suppression elements and the regulation element may alternatively be provided at corresponding positions on the inner circumference of the retainer 30. This modified configuration has the similar advantageous effects to those of the above third embodiment.

(E3) Modification 3

The regulation element 27 is formed in the spiral shape in the above third embodiment but may be formed in a divided spiral shape. This modified structure also suppresses the uneven distribution of the molten resin.

(E4) Modification 4

The retainer 30 is formed to cover the entire circumference of the opening end 21E of the filler neck body 29 in the above embodiments but may be formed to cover at least part of the circumference of the opening end 21E. The retainer 30 formed to cover the entire circumference of the opening end 21E of the filler neck body 29 is, however, advantageous in sufficiently enhancing the mechanical strength of the opening 21F of the filler neck 20.

(E5) Modification 5

In the third embodiment described above, the retainer 30 is formed not to come into contact with any of the inner circumference, the opening end 21E, the suppression elements 22 and the regulation element 27 of the filler neck body 29. The retainer 30 may alternatively be formed to come into contact with any of the inner circumference, the opening end 21E, the suppression elements 22 and the regulation element 27 of the filler neck body 29. Even in the case that the resin is melted by the contact, the configuration with the suppression elements 22 suppresses the molten resin from flowing to the inner circumferential side of the filler neck body 29, compared with the configuration without the suppression elements 22. The configuration with the regulation element 27 suppresses the uneven distribution of the molten resin, compared with the configuration without the regulation element 27.

(E6) Modification 6

In the embodiments described above, the contact part 28 of the filler neck body 29 is formed to be gently protruded outward in the radial direction. The shape of the contact part 28 is, however, not limited to the above embodiments. For example, the contact part 28 may be formed to be protruded in a step-like form or may not be protruded. When the contact part 28 of the filler neck body 29 is not protruded, the contact part 38 of the retainer 30 may be formed to be protruded inward in the radial direction to ensure the contact between the filler neck body 29 and the retainer 30.

(E7) Modification 7

The contact part 28 may alternatively be formed on the opening end 21E or on the inner circumference of the filler neck body 29. In other words, the filler neck body 29 and the retainer 30 may be joined with each other at the opening end 21E or at the inner circumference of the filler neck body 29. When the filler neck body 29 and the retainer 30 are joined with each other at the opening end 21E of the filler neck body 29, the suppression elements 22 should be formed on the inner circumferential side of the filler neck body 29. When the filler neck body 29 and the retainer 30 are joined with each other at the inner circumference of the filler neck body 29, the suppression elements 22 should be formed on the inner circumferential side of the filler neck body 29 and more specifically on the pipe connecting member side of the contact part 28, in other words, on the opposite side to the opening end 21 across the contact part 28. This modified configuration also reduces the likelihood of a trouble, such as catch of the fuel cap FC, due to deformation of the inner circumferential shape of the filler neck body 29 by the molten resin.

(E8) Modification 8

The fourth embodiment described above as the first groove 35 and the second groove 36 as the holes formed in the retainer 30E. There are various modifications with regard to the holes formed in the retainer 30E. For example, either the first groove 35 or the second groove 36 may be formed as only one hole, or three or more grooves may be formed. The shape of the hole formed in the retainer 30E is not limited to the groove in the arc shape of 90 degrees formed in the large diameter part 39 but may be, for example, a plurality of holes in a circuit shape or a groove in an arc shape of an angle other than 90 degrees. The hole formed in the retainer 30E may be formed in a spiral shape in the large diameter part 39, like the regulation element 27 formed in the filler neck body 29B of the third embodiment.

Figure 11:
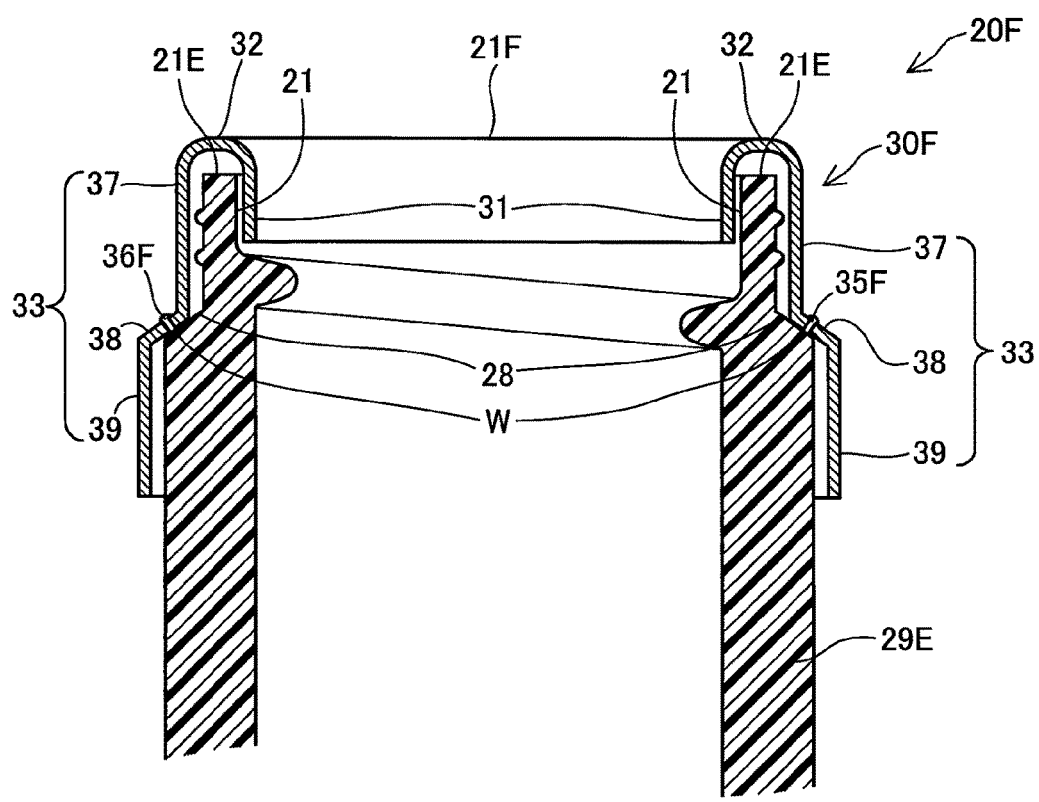
FIG. 11 is a diagram schematically illustrating the cross sectional structure of part of a filler neck according to another modification.
Figure 12:
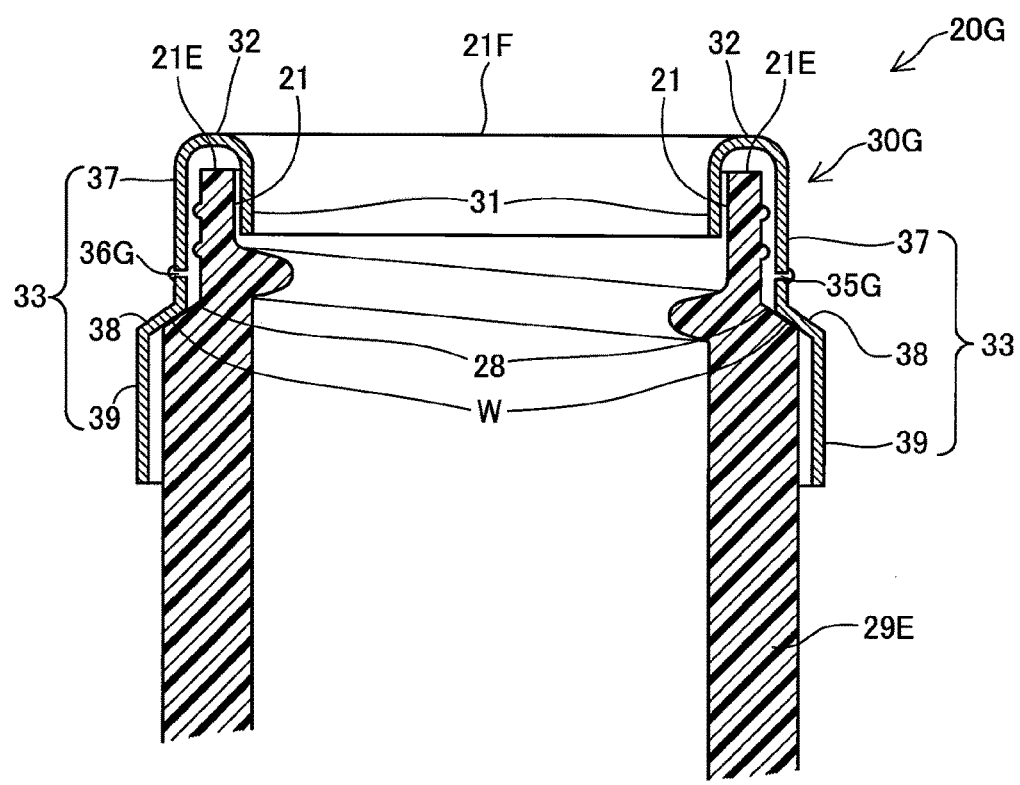
FIG. 12 is a diagram schematically illustrating the cross sectional structure of part of a filler neck according to another modification.
Figure 13:
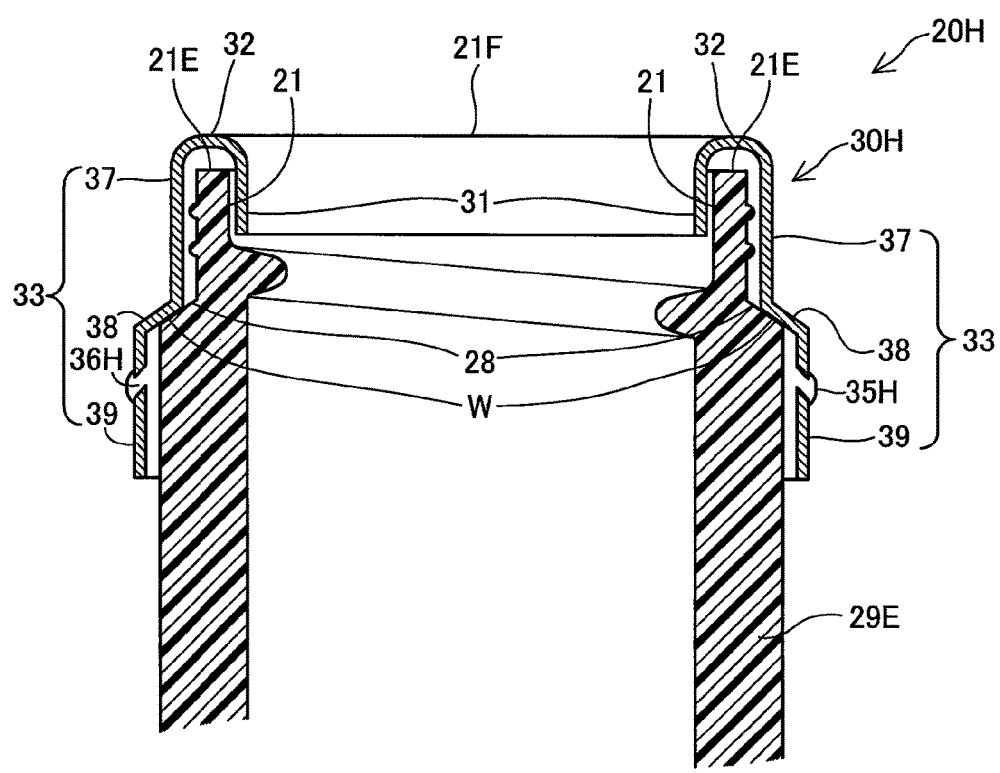
FIG. 13 is a diagram schematically illustrating the cross sectional structure of part of a filler neck according to another modification.

The first groove 35 and the second groove 36 are formed in the large diameter part 39 of the retainer 30E in the above fourth embodiment, but may not be necessarily formed in the large diameter part 39 and may be formed in the contact part 38 or the small diameter part 37. FIGS. 11 to 13 are diagrams, each schematically illustrating the cross sectional structure of part of a filler neck according to a modification. A filler neck 20F shown in FIG. 11 differs from the filler neck 20E of the fourth embodiment by the positions where a first groove 35F and a second groove 36F are formed in a retainer 30F, but otherwise has the similar structure, which is not specifically described herein. As shown in FIG. 11, the first groove 35F and the second groove 36F are formed in the contact part 38 constituting part of the outer peripheral portion 33. The first groove 35F and the second groove 36F are respectively through holes formed to pass through the contact part 38 parallel to the thickness direction. Like the first groove 35 and the second groove 36 of the fourth embodiment, the first groove 35F and the second groove 36F on the retainer 30F are formed on the opposite sides about the axis of the retainer 30F to be positioned on an identical plane in the cross section perpendicular to the axis of the retainer 30F. A first groove 35G or 35H and a second groove 36G or 36H in each of the modifications shown in FIGS. 12 and 13 described below have similar arrangement.

A filler neck 20G shown in FIG. 12 differs from the filler neck 20E of the fourth embodiment by the positions where a first groove 35G and a second groove 36G are formed in a retainer 30G, but otherwise has the similar structure, which is not specifically described herein. As shown in FIG. 12, the first groove 35G and the second groove 36G are formed in the small diameter part 37 constituting part of the outer peripheral portion 33. The first groove 35G and the second groove 36G are respectively through holes formed to pass through the small diameter part 37 parallel to the thickness direction.

A filler neck 20H shown in FIG. 13 differs from the filler neck 20E of the fourth embodiment by the shape of a first groove 35H and a second groove 36H formed in the large diameter part 39 of a retainer 30H, but otherwise has the similar structure, which is not specifically described herein. As shown in FIG. 13, the first groove 35H and the second groove 36H are not formed to pass through the large diameter part 39 parallel to the thickness direction but are formed as grooves inclined to the large diameter part outer circumferential surface 39b of the large diameter part 39 to be away from the opening 21F along the direction from the large diameter part inner circumferential surface 39a to the large diameter part outer circumferential surface 39b. The filler neck 20H including the retainer 30H having the first groove 35H and the second groove 36H formed therein thus more effectively prevents unintentional detachment of the retainer 30H from the filler neck body 29E.

The first groove 35 and the second groove 36 formed in the retainer 30E of the fourth embodiment may be replaced by a convex or concave formed in the circumferential direction of the filler neck 20E on at least one of the filler neck body 29E and the retainer 30E. The filler neck body 29E and the retainer 30E may be joined with each other at the convex or at the concave. More specifically, the outer peripheral portion 33 of the retainer 30E is partly caulked to form a convex along the circumferential direction. In this modified configuration, the molten resin flows to the convex formed along the circumferential direction in the retainer 30E. The resulting manufactured filler neck 20E accordingly prevents unintentional detachment of the retainer 30E along the axial direction perpendicular to the circumferential direction.

(E9) Modification 9

In the fourth embodiment described above, addition of maleic anhydride to the resin material used to form the filler neck body 29E provides the chemical bonding between the surface of the filler neck body 29E and the retainer 30E. Another suitable treatment may be performed to strongly join the filler neck body 29E with the retainer 30E. For example, a portion of the retainer 30E corresponding to the weld W may be subjected to blast treatment or corona discharge treatment, so that the filler neck body 29E and the retainer 30E are joined with each other strongly. The heating technique employed to melt the weld W is not limited to the technique of heating the entire contact part 38 of the retainer 30E but may be, for example, laser heating as an optical heating technique or vibrational heating by thermal vibration.

The filler neck body 29E may be made of a material other than the resin material including maleic anhydride, in order to provide the chemical bonding between the surface of the filler neck body 29E and the retainer 30E. The filler neck body 29E may be made of a polyester resin or an epoxy resin, such as polyamide (PA), polycarbonate (PC) or polybutylene terephthalate (PBT).

Addition of maleic anhydride to the resin material used to form the filler neck body 29E of the fourth embodiment or the blast treatment or another treatment of the filler neck body 29E may also be applied to the other embodiments.

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

The invention claimed is:

1. A fuel supply system configured to supply fuel ejected from a fuel nozzle to a fuel tank, the fuel supply system comprising:
    a filler neck including a resin filler neck body and a metal retainer, wherein
    the filler neck body has a tubular shape and an end of the tubular shape has an opening end into which the fuel nozzle is inserted, the filler neck body comprises a resin having adhesiveness to metal and includes a first contact part that is a shallow step extending around an outer circumference of the filler neck body,
    the retainer includes a second contact part that has a bent shape corresponding to the first contact part of the filler neck body,
    the second contact part is placed to cover at least part of the opening end of the filler neck body,
    the first, contact part of the filler neck body contacts with the second contact part of the retainer, and
    the second contact part is joined with the first contact part by thermal welding in at least part of an outer circumference of the filler neck body.

2. The fuel supply system according to claim 1,
    wherein the filler neck has a suppression element formed between the outer circumference of the filler neck body and the retainer and between the opening end of the filler neck body and a weld at which the filler neck body is welded to the retainer, and arranged to suppress resin melted during thermal welding from flowing into the opening end side.

3. The fuel supply system according to claim 2,
    wherein the suppression element is formed as a projection on the outer circumference of the filler neck body.

4. The fuel supply system according to claim 2,
wherein the suppression element is formed on the outer circumference of the filler neck body in an annular shape.

5. The fuel supply system according to claim 4, wherein the filler neck body consists essentially of polyethylene.

6. The fuel supply system according to claim 2,
wherein the filler neck body has an enlarged diameter part having diameter gradually increasing with distance from the opening end, and
the weld is part, of an outer circumference of the enlarged diameter part.

7. The fuel supply system according to claim 6,
wherein the enlarged diameter part includes a reverse tapered section having the diameter gradually increasing with distance from the opening end.

8. The fuel supply system according to claim 2,
wherein the filler neck has a regulation element formed in an approximately spiral shape between the outer circumference of the filler neck body and the retainer at a position near to the weld and on an opposite side to the opening end across the wield.

9. The fuel supply system according to claim 8,
wherein the regulation element is formed as a projection on the outer circumference of the filler neck body.

10. The fuel supply system according to claim 2,
wherein the retainer has a hole formed in at least part of a portion opposed to the outer circumference of the filler neck body.

11. The fuel supply system according to claim 1, wherein the first contact part of the filler neck body is thermally welded to the second contact part of the retainer.

\* \* \* \* \*